(12) United States Patent
McArdle

(10) Patent No.: US 7,577,711 B2
(45) Date of Patent: Aug. 18, 2009

(54) CHAT ROOM COMMUNICATION NETWORK IMPLEMENTATION ENABLING SENDERS TO RESTRICT THE DISPLAY OF MESSAGES TO THE CHAT ROOM CHRONOLOGICAL DISPLAYS OF ONLY DESIGNATED RECIPIENTS

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/348,901

(22) Filed: Feb. 7, 2006

(65) Prior Publication Data
US 2007/0185993 A1 Aug. 9, 2007

(51) Int. Cl.
G06F 15/16 (2006.01)
(52) U.S. Cl. .............. 709/207; 709/206; 709/225; 715/758
(58) Field of Classification Search .......... 709/206, 709/207, 204, 225; 715/500.1, 758; 345/753
See application file for complete search history.

(56) References Cited

U.S. PATENT DOCUMENTS

| | | | |
|---|---|---|---|
| 2003/0001890 A1* | 1/2003 | Brin | 345/753 |
| 2003/0041092 A1* | 2/2003 | Woo | 709/200 |
| 2004/0078444 A1 | 4/2004 | Malik | |
| 2004/0210639 A1* | 10/2004 | Ben-Yoseph et al. | 709/206 |
| 2004/0221224 A1* | 11/2004 | Blattner et al. | 715/500.1 |
| 2004/0225716 A1* | 11/2004 | Shamir et al. | 709/204 |
| 2006/0026252 A1* | 2/2006 | Caspi et al. | 709/207 |
| 2006/0031314 A1* | 2/2006 | Brahms et al. | 709/206 |
| 2007/0011235 A1* | 1/2007 | Mutikainen et al. | 709/204 |
| 2007/0174407 A1* | 7/2007 | Chen et al. | 709/207 |

* cited by examiner

*Primary Examiner*—Jungwon Chang
(74) *Attorney, Agent, or Firm*—Jerry B. Kraft; Libby Z. Handelsman; Mark S. Walker

(57) ABSTRACT

A participant in an instant messaging chat room may send restricted messages to only a set of selected participants in the chat room. Enabling a user at a display station to select a set of only users to receive a restricted message, and send the restricted message to this selected group of users, and displaying the restricted message only in the chronological displays in the stations of the set of recipient users, i.e. not displaying the restricted message in the displays of the other users in the chat room.

11 Claims, 6 Drawing Sheets

US 7,577,711 B2

CHAT ROOM COMMUNICATION NETWORK IMPLEMENTATION ENABLING SENDERS TO RESTRICT THE DISPLAY OF MESSAGES TO THE CHAT ROOM CHRONOLOGICAL DISPLAYS OF ONLY DESIGNATED RECIPIENTS

TECHNICAL FIELD

The present invention relates to computer managed communication networks, such as the World Wide Web (Web) or like private intranet networks that distribute electronic messages transmitted to users who may log on at a variety of display terminals or stations, and particularly to chat room systems using such networks.

BACKGROUND OF THE RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents. The Web or Internet, which had quietly existed for over a generation as a loose academic and government data distribution facility, reached "critical mass" and commenced a period of phenomenal expansion. With this expansion, businesses and consumers have direct access to all matter of documents and media through the Web.

The availability of extensive distribution channels has made it possible to keep all necessary parties in business, government and public organizations completely informed of all transactions that they need to know about at almost nominal costs through conventional electronic mail.

Among the many and varied industry efforts to focus the user's attention on the mail and mail sources most significant to a user from among the many available to him has been instant messaging. In an instant messaging system, a user may log in at any individual display terminal on a network and join a select group of other users logged in at other like display terminals to form a set of users at terminals that are, in effect, interconnected at server levels in networks for communications. International Business Machines Corporation's Lotus Sametime product line is an example of such an instant messaging system, as is proprietary Instant Messaging (IM) available from America Online, Inc. (AOL) or Microsoft's MSN business organizations. The selected set of participants in any instant messaging network are people with special common, but often limited, interests, e.g. a group of close friends, a family, business partners, a business team, a group of sports or game players, an education study group. The purpose of such an instant messaging team or group is real-time textual conversations within the group.

In such instant messaging systems, the chat room is the focus. In such a chat room implementation, there is displayed on each display screen of each of the participants the same chronological scrollable sequence of instant messages from each participant who has chosen to send a message. Thus, everyone who is logged on to the chat room gets the same chronological display screen, i.e. whatever the sender sends, all chat room participants get. This presents a problem for any participant who wishes to address only one or more of the chat room participants. For example, in a business meeting chat room, one of the participants may wish to make an aside to a set of only one or more of the participants who are in the same business team. In a family chat room, a subset of two or three may wish talk about some family gossip out of view of the rest of the group. In the past, the sender of such ancillary information had to set up a separate instant message that he could send to his selected participants outside of the chat room. This was very awkward, inconvenient and required continual switching between chat rooms and the outside instant messaging.

SUMMARY OF THE PRESENT INVENTION

The present invention offers a chat room implementation that permits a participant in an instant messaging chat room to send restricted messages to only a set of selected participants in the chat room within the bounds of the chat room. The invention involves the combination of means enabling a user at a display station to select a set of only users to receive a restricted message, means enabling the sender to send this restricted message to this selected group of users, and means for displaying the restricted message only in the chronological displays in the stations of the set of recipient users and not displaying the restricted message in the displays of the other users in the chat room. This set of users to whom the restricted message is sent may number one or more.

According to another aspect of the invention, the chronological display of the restricted users includes an indicator showing that a message is restricted. Thus, the invention may include a plurality of means enabling a plurality of users at a corresponding plurality of display stations to send the restricted messages, and the indicators showing that the message is restricted further indicate the sender of said restricted message. In addition, the chronological display of the sender of the restrictive message also should include the restricted message.

The invention may result in a network chat room arrangement wherein the recipients or users of a restricted message are also enabled to select a set of only users to receive a restricted message, and to send such restricted messages to this new set of users so that a supplemental chat room message network is provided between the senders and user recipients of restricted messages with the restricted messages chronologically interleaved with the unrestrictive messages in the chronological displays of the senders and user recipients of the restricted messages.

The invention also comprehends that the transmitted restricted messages may be required to pass through a network security firewall.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENTS

Figure 1:
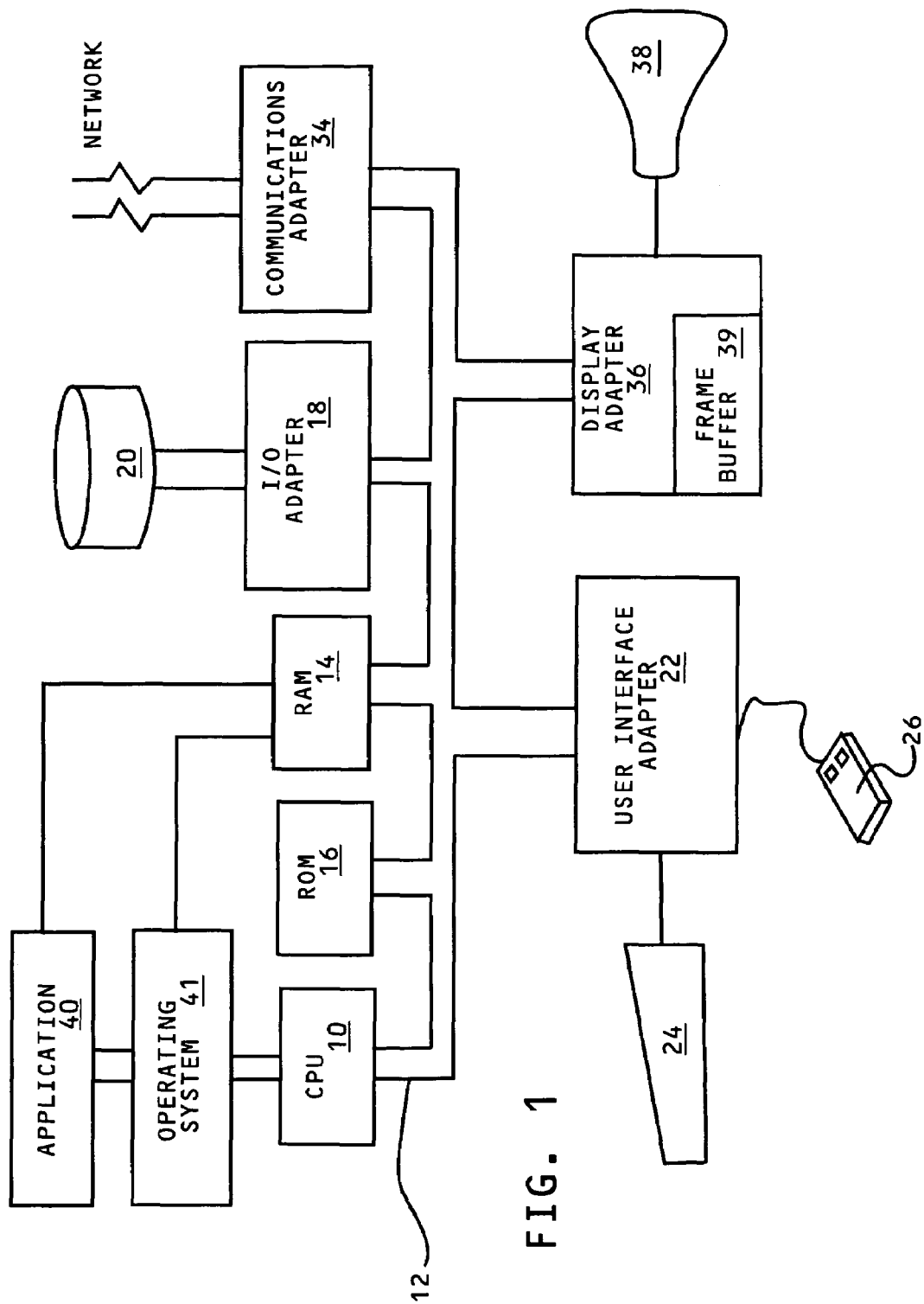
FIG. 1 is a block diagram of a data processing system including a central processing unit and network connections via a communications adapter that is capable of implementing the interactive display terminals, as well as servers in the instant messaging network of this invention.

Referring to FIG. 1, a typical data processing system is shown that may function as the computer controlled network terminals, Web terminals or stations used conventionally as any of the sending or receiving stations for instant messaging transmissions providing the chat rooms of the present invention. The system shown is also illustrative of any of the server computers used for the instant message distribution to be described in greater detail with respect to FIG. 2. A central processing unit (CPU) 10, may be one of the commercial microprocessors in personal computers available from International Business Machines Corporation (IBM) or Dell Corporation; when the system shown is used as a server computer at a network distribution site to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows XP™ or Windows2000™, as well as UNIX and other IBM AIX operating systems. Application programs 40, controlled by the system, are moved into and out of the main memory Random Access Memory (RAM) 14. These programs include the programs of the present invention for enabling the sending of restricted messages to a group of restrictive message recipients in network chat rooms. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the network in order to access instant messages. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective, the various elements and methods that may be related to the present invention. Since a major aspect of the present invention is directed to instant messages transmitted over networks to provide chat rooms, an understanding of networks and their operating principles would be helpful. We will not go into great detail in describing the networks to which the present invention is applicable. Reference has also been made to the applicability of the present invention to a network, such as the Internet. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to the lower level objects in the hierarchy through a variety of network server computers. The instant messaging in the chat rooms, as will be described with respect to FIG. 2, may be distributed through a local network, e.g. an intranet, or through the Internet.

Figure 2:
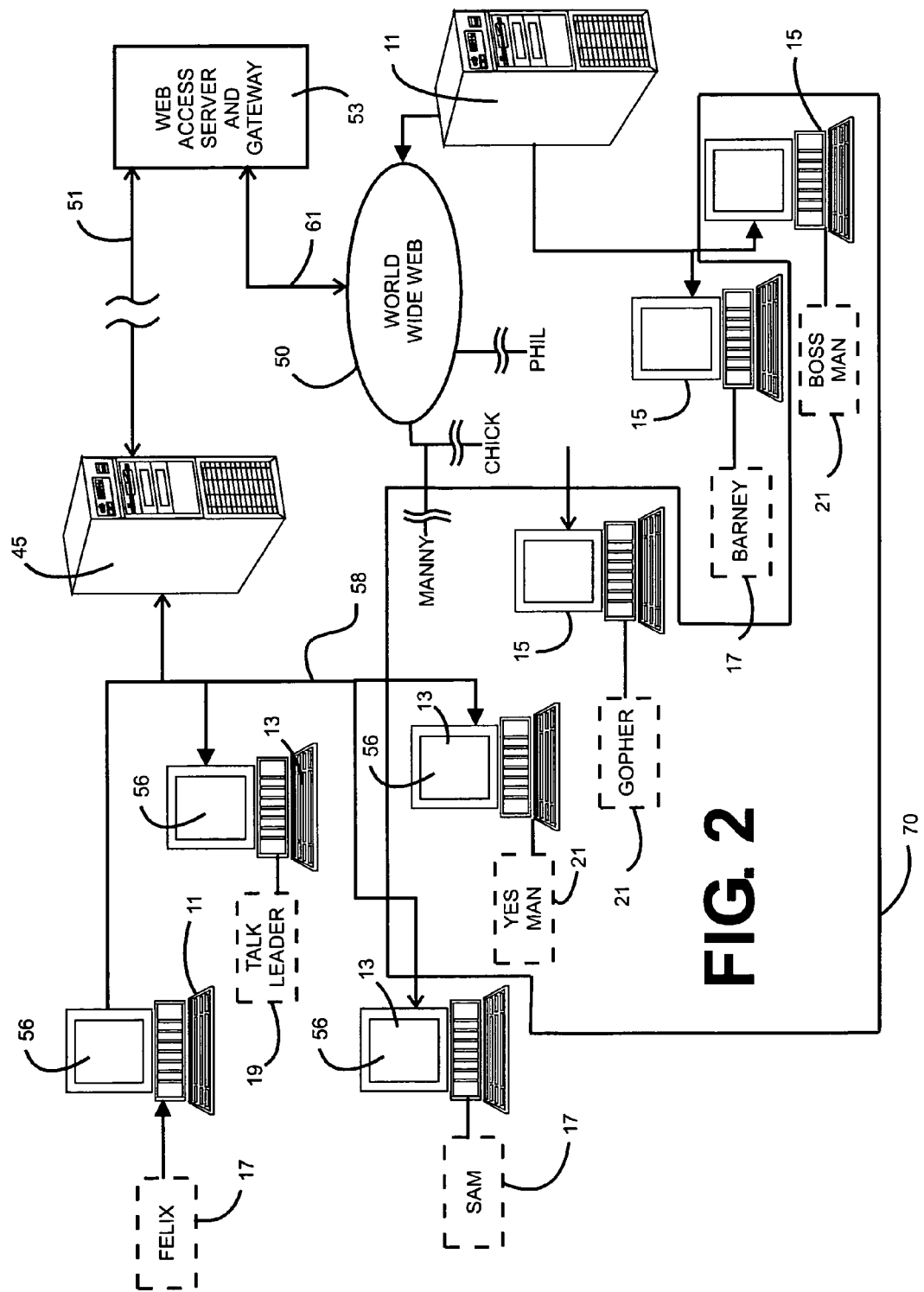
FIG. 2 is a generalized view of a Web or Internet network that may be used for instant messaging distribution in the practice of the present invention.

A generalized diagram of a Web or Internet portion is shown to illustrate the instant mail distribution system of the present invention in FIG. 2. The eleven users or participants will be described in further detail in connection with the display screens of FIGS. 3 and 4. The eleven participants are in two groups: Felix 17, Sam 17, Barney 17 and Talk Leader 19, as well as Manny, Chick and Phil (not shown in detail) who are not involved in the restricted messaging; and Bossman 21, Gopher 21 and Yesman 21 who are involved in restrictive messaging. The non-restrictive messaging or conventional chat room participants are at computers 56 with display screens 57, which will be illustrated in FIG. 4. The restrictive messaging set includes the initial sender Bossman and recipient users Gopher and Yesman at computers 15 with display screens 13 that will be illustrated in FIG. 3. These participating computers are respectively connected to each other via the Web network 50 either through illustrative Web server 11 or in a more global network wherein Web server 45 is connected through a Web/Internet access server and appropriate gateway 53 via connector 61. Reference may be made to the above-mentioned *Mastering the Internet*, pp. 136-147, for typical connections between local display stations to the Web via network servers, any of which may be used to implement the system on which this invention is used.

Figure 3:
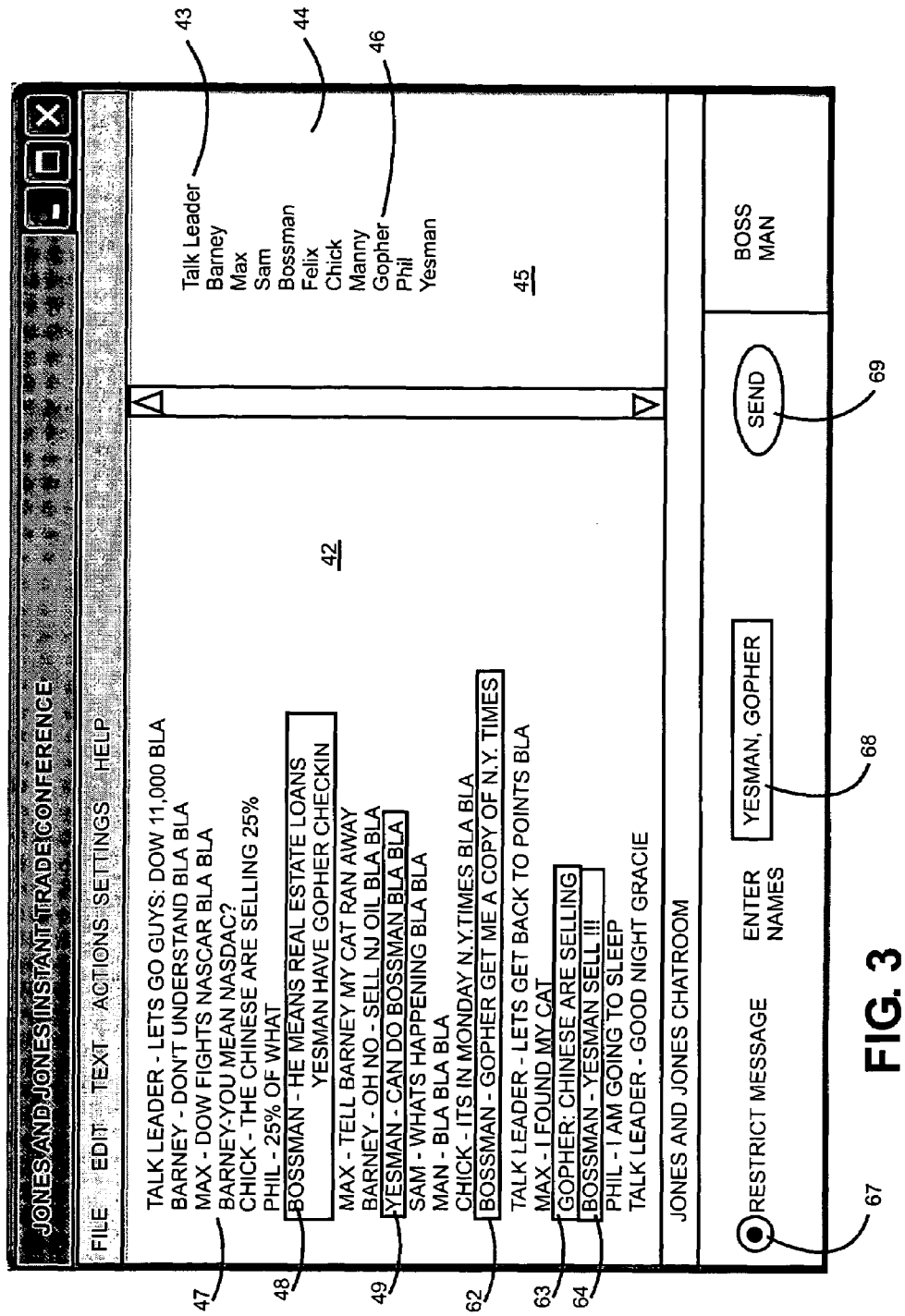
FIG. 3 is a diagrammatic illustration of an interactive display interface used for the group of instant messaging users in a chat room of several participating users to show the means enabling the sender at this terminal to send and receive restricted messages.
Figure 4:
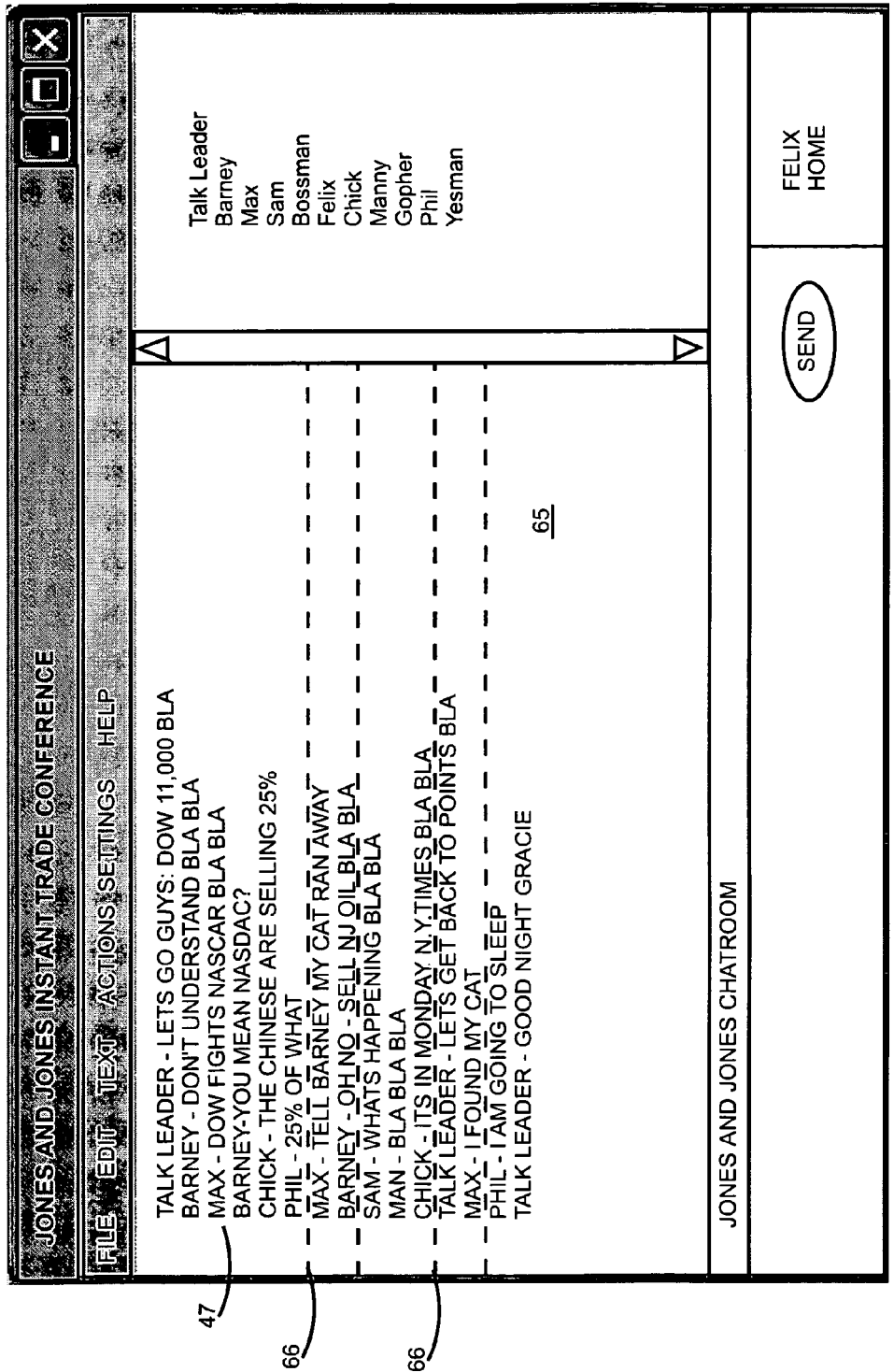
FIG. 4 is the same display interface of FIG. 3 as would be shown at the interfaces used for the group of instant messaging users in a chat room of FIG. 3 for participating users who have not sent or received restricted messages.

Within this network set up, we will now consider the illustrative instant messaging with personalized status responses to be described with respect to FIGS. 3 and 4. In FIG. 3, there is illustrated a display screen for a user in a chat room who has sent a restrictive message to two other users, and thereby established a supplementary chat room. In effect, the display screen of FIG. 3 is the display screen 13 shown to the three participants in the supplementary chat room displaying the restrictive messages. In the display, there is a listing 45 of the eleven logged in users or participants. The chat room illustrated is under the control of a talk leader and the display screen 13 initially provides a scrollable chronological run 47 of the textual comments of the participants with each name associated with the remarks. The particular chat room illustrated is a loose conference on instant trade of stocks and other tradable entities. The particular display screen is that of Bossman. At message 48, Bossman has noted some information dropped in the discourse that warrants further consideration. However, he does not wish to tip off other participants. So, he decides to try to restrictively communicate with two of his employees: Gopher and Yesman to get them to look further into this matter. Bossman clicks on his Restrict Message button 67 and is prompted to enter the names of the recipients of the restrictive message: Yesman and Gopher 68. He then presses Send and this message 48 is sent only to Yesman and Gopher. This results in an interchange of restrictive messages from Yesman 49, Bossman 62, Gopher 63 and Bossman 64 concerning the sale of real estate holdings of Bossman. The restrictive messages appear only in the chronological displays of those senders and recipients of the restricted messages. These restrictive messages are interleaved with the normal chat room chronological listings on screen 13. The restricted messages should have associated indicators indicating that they are restricted. This may be highlighting or coloring. Where there are a plurality of participants in the restrictive messaging, as in the present illustration, colors may be used to distinguish between the participants in the restrictive messaging.

While the display screen 13 is being shown to all chat room participants who are involved in restrictive messaging, display screen 57 of FIG. 4 is displayed to all participants who are not involved in restrictive messaging. It should be noted that screen 57 is a conventional chronological chat room screen. In order, to illustrate the positions of the restrictive messages 48, 49, 62, 63 and 64, FIG. 3, relative to the conventional display screen 13, FIG. 4, phantom dot-dash lines 66 have been added to screen 13. It should be noted that the restrictive message communications between Bossman, Gopher and Yesman have provided the secondary restrictive message chat room portion marked by enclosing line 70, FIG. 2.

Figure 5:
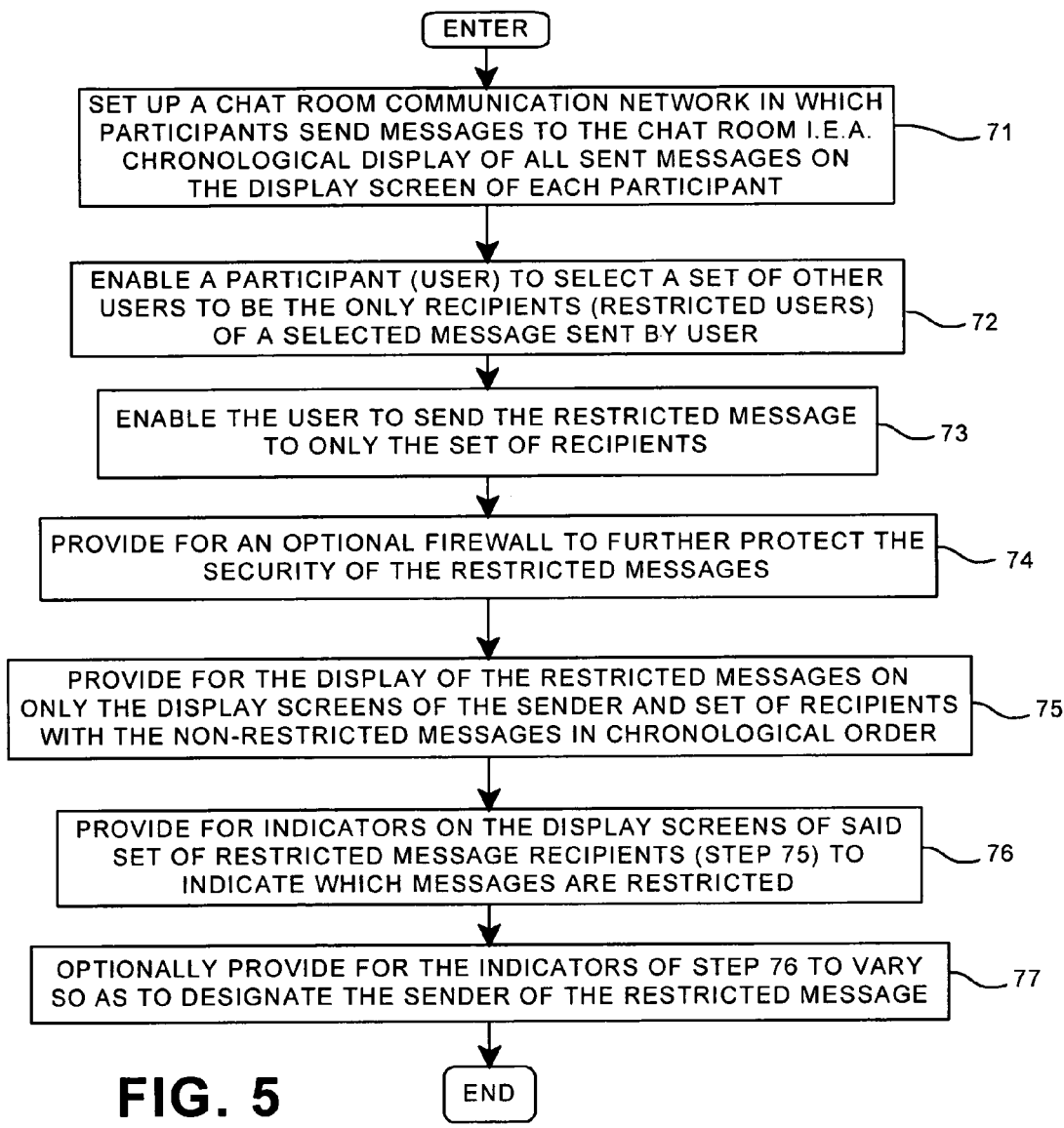
FIG. 5 is an illustrative flowchart describing the setting up of the programming functions to form the implementation enabling the sending of restrictive messages in chat rooms in accordance with the present invention.

FIG. 5 is a flowchart showing the development of a process according to the present invention for enabling a sender at a display station to restrict the display of the sent message to specified recipients. In any conventional instant messaging network system, there is set up a chat room in which the participants send messages to the chat room to result in a chronological display of all sent messages on the display screen of each participant, step 71. Each participant or user is enabled to select a set of other users to be the only recipients (restricted users) of a selected message sent by the user, step 72. The user is enabled to send the restricted message to only the set of recipients, step 73. Provision is made for an optional firewall to further protect the security of the restricted messages, step 74. Provision is made for the display of the restricted messages on only the display screens of the sender and set of recipients with the non-restricted messages in chronological order, step 75. Provision is made for indicators on the display screens of the set of restricted message recipients of step 75 to indicate which messages are restricted, step 76. There may be optional provision for the indicators of step 76 to vary so as to designate the sender of the restricted message, step 77.

Figure 6:
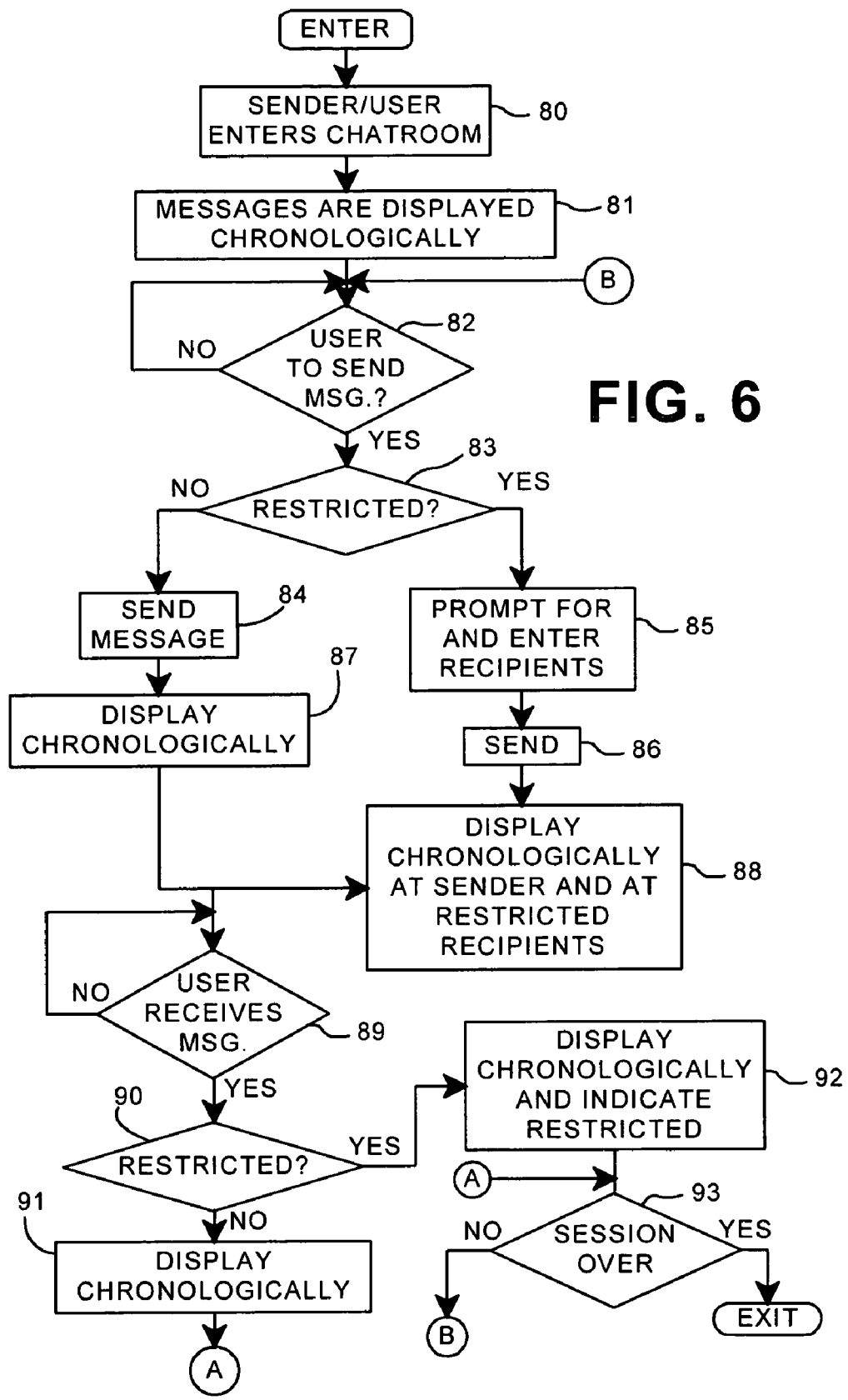
FIG. 6 is a flowchart of an illustrative run of the program set up according to FIG. 5.

A simplified run of the process set up in FIG. 5 and described in connection with FIGS. 3 and 4 will now be described with respect to the flowchart of FIG. 6. At the display terminal of the chat room user, there is provided an interface such as that of FIGS. 3 and 4. Let us assume that in the system to be described, a group of participants is set up for a chat room. A participant/user enters the chat room, step 80. A chronological display of the past sequence of messages for the past period up to the present is presented to the user, step 81. The process awaits the sending of a message by the user, decision step 82. If Yes, a determination is made, step 83, as to whether the message is restricted as to recipients. If No, the unrestricted message is sent, step 89, to all recipients. The chronological display is updated, step 87. If Yes, the message is restricted, the sender is prompted to enter the restricted recipients, step 85, and the message is sent, step 86. The chronological display is updated to display the sent message only at the sender's and restricted users' display screens 88. The display screens of the other participants in the chat room remain unchanged. Then, or after step 87 or at any point in the chat room sequence, determination is made at a user display station as to whether a message has been received, step 89. If Yes, a further determination is made, step 90, as to whether the received message is restricted. If No, the message is added to the chronological sequential display, step 91. If Yes, the message is displayed chronologically with an indication of restriction, step 92. At this point, or after step 91 via branch "A", a determination is made as to whether the session is over, step 93. If Yes, the session is exited. If No, the process is returned via branch "B" to step 82, and the chat room is continued.

Although certain preferred embodiments have been shown and described, it will be understood that many changes and modifications may be made therein without departing from the scope and intent of the appended claims.

What is claimed is:

1. In a chat room communication message network including a plurality of display stations operated by a plurality of users to selectively send messages within a chronological sequence of messages to a central server and to receive, at each station, a display of said chronological sequence of messages, a method enabling any user at a display station to restrict the display of a message within said sequence sent by said enabled user comprising:
    enabling a user at a display station to select a set of only users to receive a restricted message;
    enabling said enabled user to send said restricted message within said chronological sequence of messages;
    displaying said restricted message only in the chronological sequence of messages displays in the stations of said set of recipient users including an indicator indicating message is restricted and the sender of the message; and
    displaying said sequence of messages including said indicator on the display of said enabled sending user;
    wherein a supplemental chat room message network is provided between the senders and user recipients of restricted messages with the restricted messages chronologically interleaved with the unrestrictive messages in the chronological sequence of messages on the displays of said senders and user recipients.

2. The method of claim 1 wherein said set of only users to receive includes only a single user.

3. The method of claim 1 further including the steps of:
    enabling a plurality of users an a corresponding plurality of display stations to send said restricted messages within said chronological sequence of messages; and
    said indicators showing than the message is restricted further indicate the sender of said restricted message.

4. The method of claim 1 further including the steps of:
    providing a network security firewall; and
    requiring a plurality of said restricted messages to be transmitted through said security firewall.

5. A computer useable memory having scored therein a computer readable application program for enabling any user at a display station to restrict the display of a message sent by said user within a chronological sequence of messages sent by a plurality of users in a chat room communication message network including a plurality of display stations operated by said plurality of users to selectively send messages, within said chronological sequence of messages, and to receive, at each station, a display of said chronological sequence of messages, wherein the computer readable application program when executed on a computer causes the computer to:

enable a user an a display station to select a set of only users to receive a restricted message;

enable said enabled user to send said restricted message within said chronological sequence of messages;

display said restricted message only in the chronological sequence of messages displays in the stations of said set of recipient users including an indicator indicating message is restricted and the sender of the message; and display said sequence of messages including said indicator on the display of said enabled sending user;

wherein a supplemental chat room message network is provided between the senders and user recipients of restricted messages with the restricted messages chronologically interleaved with the unrestrictive messages in the chronological sequence of messages on the displays of said senders and user recipients.

6. The computer usable medium of claim 5 wherein said set of only users to receive includes only a single user.

7. The computer usable medium of claim 5 wherein said computer program when executed further causes the computer to:

enable a plurality of users at a corresponding plurality of display stations to send said restricted messages within said chronological sequence of messages; and further indicate the sender of said restricted message in association with each of said indicators showing that the message is restricted.

8. In a chat room communication message network including a plurality of display stations operated by a plurality of users to selectively send messages within a chronological sequence of messages to a central server and to receive, at each station, a display of said chronological sequence of messages, a system enabling any user at a display station to restrict the display of a message within said sequence sent by said enabled user comprising:

a processor;

a computer memory holding computer program instructions which when executed by the processor perform the method comprising:

enabling a user at a display station to select a set of only users to receive a restricted message;

enabling said enabled user to send said restricted message within said chronological sequence of messages;

displaying said restricted message only in the chronological sequence of messages displays in the stations of said set of recipient users including an indicator indicating message is restricted and the sender of the message; and displaying said sequence of messages including said indicator on the display of said enabled sending user;

wherein a supplemental chat room message network is provided between the senders and user recipients of restricted messages with the restricted messages chronologically interleaved with the unrestrictive messages in the chronological sequence of messages on the displays of said senders and user recipients.

9. The chat room communication network system of claim 8 wherein said set of only users to receive includes only a single user.

10. The chat room communication network system of claim 8 wherein the method performed further includes the steps of:

enabling a plurality of users at a corresponding plurality of display stations to send said restricted messages within said chronological sequence of messages; and said indicators showing that the message is restricted further indicate the sender of said restricted message.

11. The chat room communication network system of claim 8 wherein the method performed further includes the steps of:

providing a network security firewall; and requiring a plurality of said restricted messages to be transmitted through said security firewall.

* * * * *